United States Patent Office
3,289,230
Patented Dec. 6, 1966

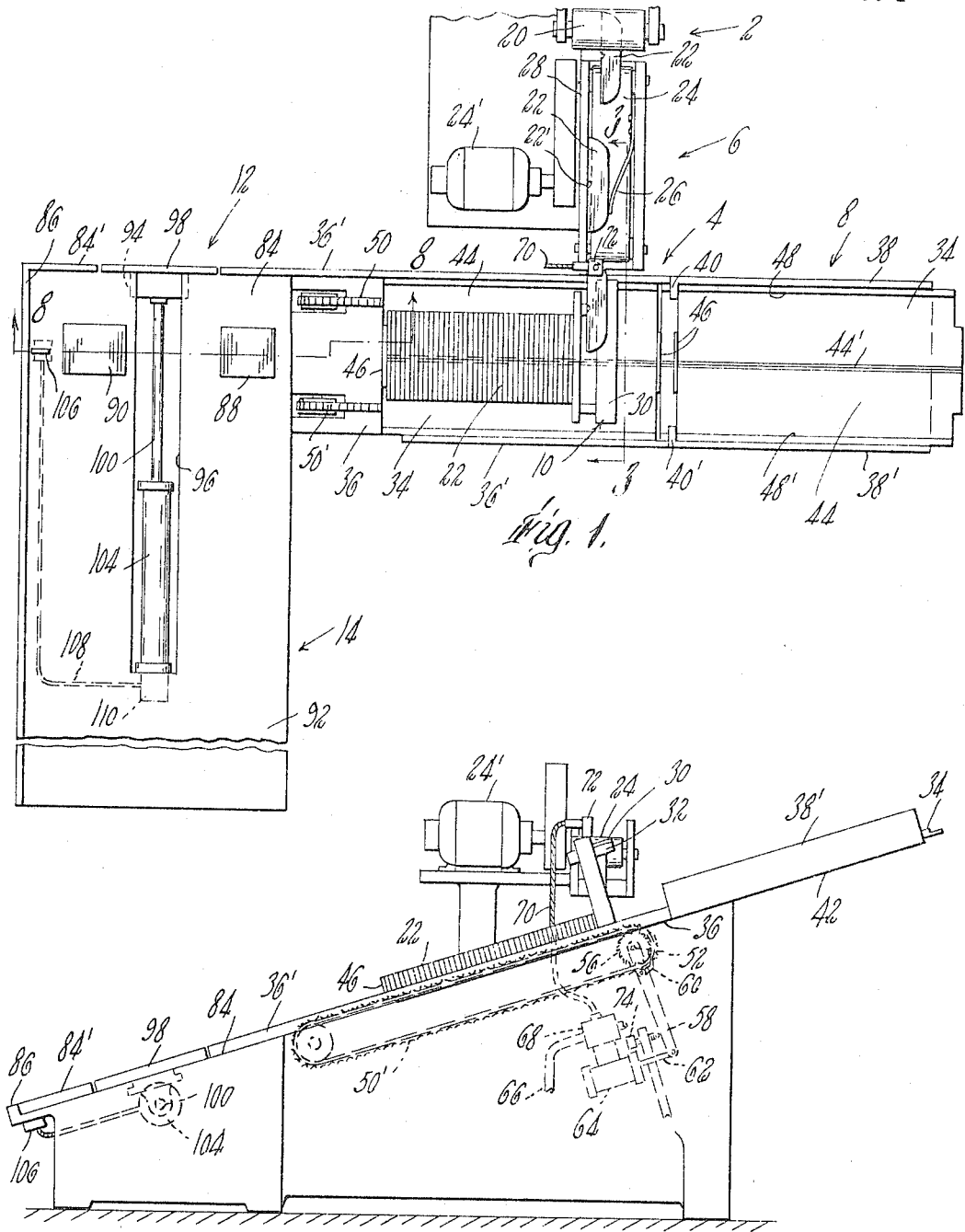

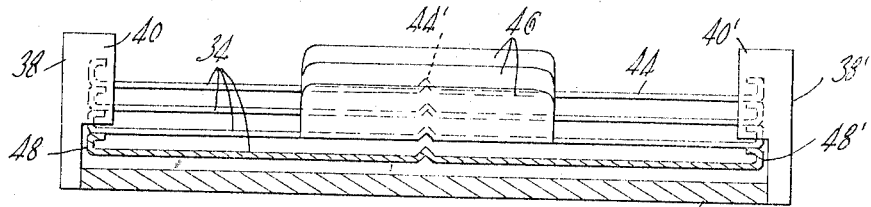
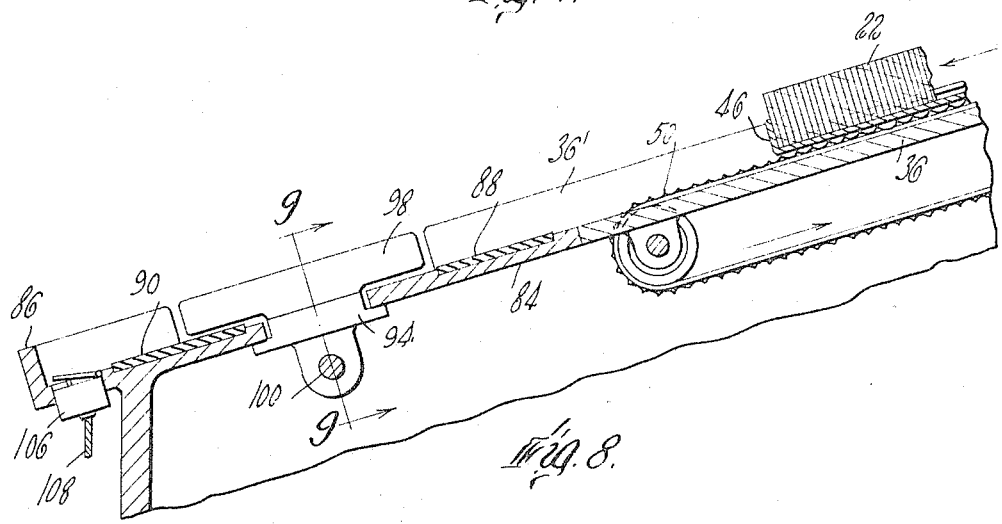
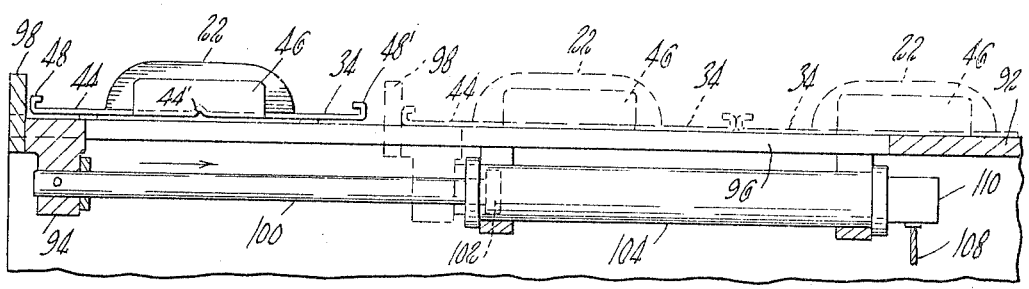

3,289,230
APPARATUS FOR LOADING FLAT ARTICLES INTO MAGAZINES
Henry W. Detert, Norway, Maine, assignor to Spaulding Fibre Company, Inc., North Rochester, N.H., a corporation of New Hampshire
Filed Oct. 24, 1962, Ser. No. 233,503
11 Claims. (Cl. 12—1)

The present invention relates to apparatus for loading flat articles, such as shoe counter blanks, into magazines. More particularly the invention relates to such an apparatus for use in a shoe counter production line between an apparatus which forms shoe counter blanks in flat condition and an automatic, magazine-fed apparatus which feeds the flat counter blanks into a press for molding the blanks into final shape as shoe counters.

It has been a practice heretofore in the manufacture of shoe counters to transport the flat shoe counter blanks from the apparatus on which they are made to a molding press into which the blanks are fed individually by the press operator, by hand. Recently there has come into use an automatic counter press feeding apparatus, as illustrated in U.S. Patent No. 3,044,085, dated July 17, 1962, by means of which the flat counter blanks are automatically fed from a magazine into the counter press, greatly improving the manufacturing operation at this point. Such magazines, in the form of a tray-shaped container, hold a stack of the counter blanks positioned on edge on the bottom of the magazine in face to face relationship. The magazines have heretofore had to be individually loaded by hand, a time consuming operation.

The present invention has as an object further to improve the manufacture of shoe counters by the provision of automatic apparatus for loading flat counter blanks into magazines for subsequent use in the automatic feeding of a shoe counter molding press.

Other objects, features and advantages of the invention will become apparent from the following description of one particular form of apparatus embodying the invention, in which description reference is made to the accompanying drawings, wherein FIG. 1 is a plan view of the apparatus;

FIG. 2 is an elevation, looking at the side of the apparatus which faces toward the bottom of FIG. 1;

FIG. 7 is a sectional view taken on line 7—7 of FIG. 6;

FIG. 8 is a vertical sectional view taken on line 8—8 of FIG. 1, and

FIG. 9 is a sectional view taken on line 9—9 of FIG. 8.

Figure 3:
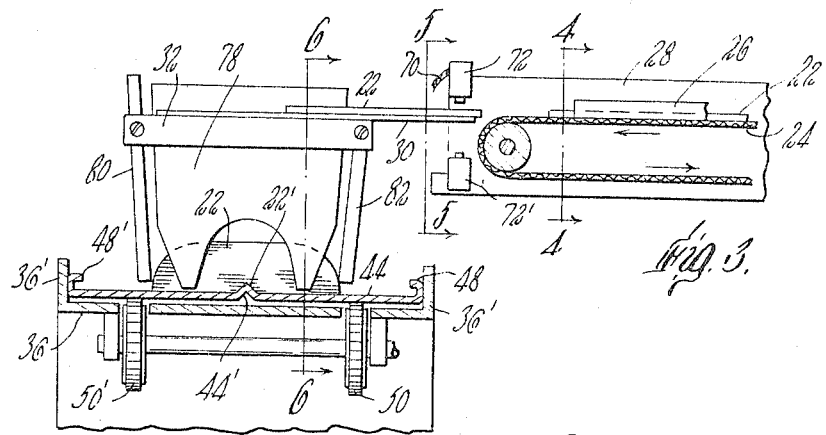
FIG. 3 is a vertical sectional view on line 3—3 of FIG. 1, looking in the direction of the arrows.
Figure 4:
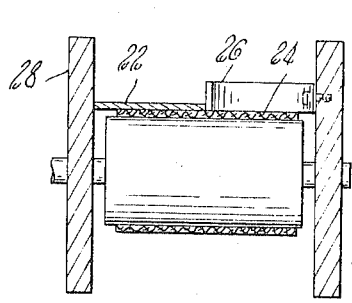
FIG. 4 is a vertical sectional view taken on line 4—4 of FIG. 3.

Referring to the drawings, the general organization of the apparatus selected for purposes of illustration and disclosure of the invention will first be described by reference to FIG. 1. A source of supply of the counter blanks at 2 feeds to the apparatus a series of flat counter blanks in succession, following each other end to end. From the supply 2 the blanks are moved to a loading station at 4 by means shown generally at 6. Means is provided at 8 for holding a vertical stack of empty magazines and advancing them one by one to the loading station at 4. At the loading station 4, means 10 is provided for turning the counter blanks on edge and depositing them one by one into the magazine which is at the loading station. Means is provided for advancing the magazine which is at the loading station 4 in a step by step manner, in timed relation with the deposition of the counter blanks into the magazine, and finally releasing the magazine for movement out of the loading station under the influence of gravity. The magazine moving out of the loading station is received on a table at 12 from which it is moved transversely of the line of advance of the magazine in the loading station to a temporary storage platform at 14.

Turning now to a description of the details of construction of the various parts making up the entire apparatus, the counter blank supply at 2 comprises a pair of feed rollers 20 which are driven to feed the counter blanks 22, downwardly as seen in FIG. 1, on to a traveling apron 24. The rollers 20 may, for example, receive the flat counter blanks 22 from apparatus which skives them or applies printed matter or a suitable coating material to the blanks. Each counter blank 22 is provided at the middle of its longer edge with a notch 22' for a purpose hereinafter described. The apron 24 is driven by motor 24', with its upper flight moving toward the loading station at 4, at a rate to take away the counter blanks as they are supplied from the rollers 20. As the blanks travel inwardly on the upper surface of the moving apron 24 they are engaged by a spring finger 26 which urges them to the left as seen in FIG. 1 with one edge in engagement with a guide member 28 whereby the blanks 22 are maintained in alignment as they are delivered from the apron 24.

From the apron 24 the blanks 22 are delivered in succession on to the upper surface of a bar 30 carried on a support 32 suitably mounted on the frame of the machine. The bar 30 is disposed above and transversely of the magazine 34 which is located at the loading station 4.

The loading station is provided by a table 36 carried on the machine frame and inclined downwardly to the left as seen in FIGS. 1, 2, 6 and 8 and adapted to support the magazines 34 during loading, and guides them for straight line movement between its upturned edges 36'.

A supply of empty magazines 34 in the form of a vertical stack is held in place at 8 by side walls 38, 38' having their ends 40, 40' adjacent the loading station turned inwardly, as shown, to retain all of the magazines except the lowermost one against downward sliding movement on the inclined bottom wall 42 of the magazine. The inclined bottom wall 42 lies in prolongation of, and may be integral with, the table 36 of the loading station.

Each magazine 34 is tray-like in general form and shape, having a bottom 44, an upstanding lip 46 at one of its ends and upwardly and inwardly turned beads 48, 48' along each of its sides. The bottom 44 of the magazine is provided with an upstanding longitudinal U-shaped bead 44' along its middle for the reception of the notches 22' in the counter blanks 22 to center the counter blanks in the magazine.

The magazines are made of a width adequate to accommodate the largest size of counter blank to be handled, whereby a single size of magazine can be employed with all sizes of blanks, the counter blanks of all sizes being centered crosswise of the magazines by engagement of the notches 22' of the blanks with the center bead 44' of the magazines.

The magazines are placed in the stack with the upstanding lip 46 disposed toward the loading station. All of the empty magazines in the vertical stack except the lowermost one are engaged at their forward end by the inturned edges 40, 40' and thus maintained in the stack against downward movement on the inclined bottom wall 42.

The lowermost empty magazine bears at its forward end against the magazine which preceded it in the stack and which is at the loading station in the course of being loaded. As the rearward end of the lowermost magazine passes downwardly beyond the inturned edges 40, 40', as the magazine leaves the stack, the magazine next above it is thus permited to fall downwardly out of engagement with the inturned edges 40, 40', and thereafter to slide out of the stack of magazines under the influence of gravity, the lip 46 passing freely between the spaced inturned edges 40, 40'.

As each magazine moves out of the stack and follows its predecessor downwardly into the loading station it is received by a pair of endless belts 50, 50' each having its upper flight lying on the surface of the table 36. The belts 50, 50' are driven so as to carry the empty magazine 35 at the loading station downwardly on the table 36 through the loading station in timed relation with the arrival of the counter blanks 22 at the loading station. For this purpose, the shaft 52 on which are mounted the rollers 54, about which the upper ends of the belts 50, 50' are trained, carries on one end thereof (FIG. 2) a ratchet wheel 56. An arm 58 pivoted on the shaft 52 carries a pawl 60 adapted to cooperate with the ratchet wheel 56 upon oscillatory movement of the arm 58 to give a step-by-step rotation to the ratchet wheel 56. The arm 58 is connected at its lower end to the piston rod 62 of a piston (not shown) in a fluid pressure operated cylinder 64. Pressure fluid from a supply line 66 is admitted alternately to the opposite ends of the cylinder 64 by means of a solenoid operated valve 68 of a conventional form. The valve 68 is connected through a lead 70 to the light responsive member 72 of a photoelectric device 72, 72' of a conventional type mounted, as appears in FIG. 3, adjacent the discharge end of the apron 24. Each counter blank 22 as it enters the loading station from the apron 24 actuates the photoelectric device 72, 72' to operate the valve 68 through one cycle, advancing and retracting the piston in the cylinder 64 and thus stepping the ratchet wheel 56 forward through the lever 58 and the pawl 60. It will be understood that the ratchet and pawl mechanism 56, 60 is merely illustrative of mechanism which can be used for the purpose and that other mechanism, such as the well known over-riding or indexing clutch, may be used instead.

The length of the stroke of the piston rod 62 is adjustable by means of a threaded adjustable abutment 74 positioned to engage the lever 58 to limit its oscillatory movement and thus to control the amount by which the ratchet wheel 56 is rotated in a single cycle and thus permit the size of the steps of the step-by-step advance of the magazine 34 to be adjusted in accordance with the dimensions of the particular counter blanks being operated upon, particularly the thickness of the blanks.

Figure 5:
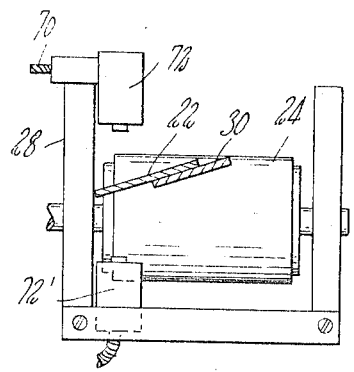
FIG. 5 is a vertical sectional view taken on line 5—5 of FIG. 3.

As each counter blank 22 leaves the apron 24 it is received on the upper surface of the transverse bar 30, as previously mentioned. The bar 30, as appears to best advantage in FIG. 5, is inclined so that its upper surface is generally parallel to the surface of the table 36. The bar 30 extends in prolongation of the apron 24 and is so located transversely of the apron, as appears in FIGS. 1 and 5, that the lower edge of the bar underlies the counter intermediate its longitudinal edges.

Figure 6:
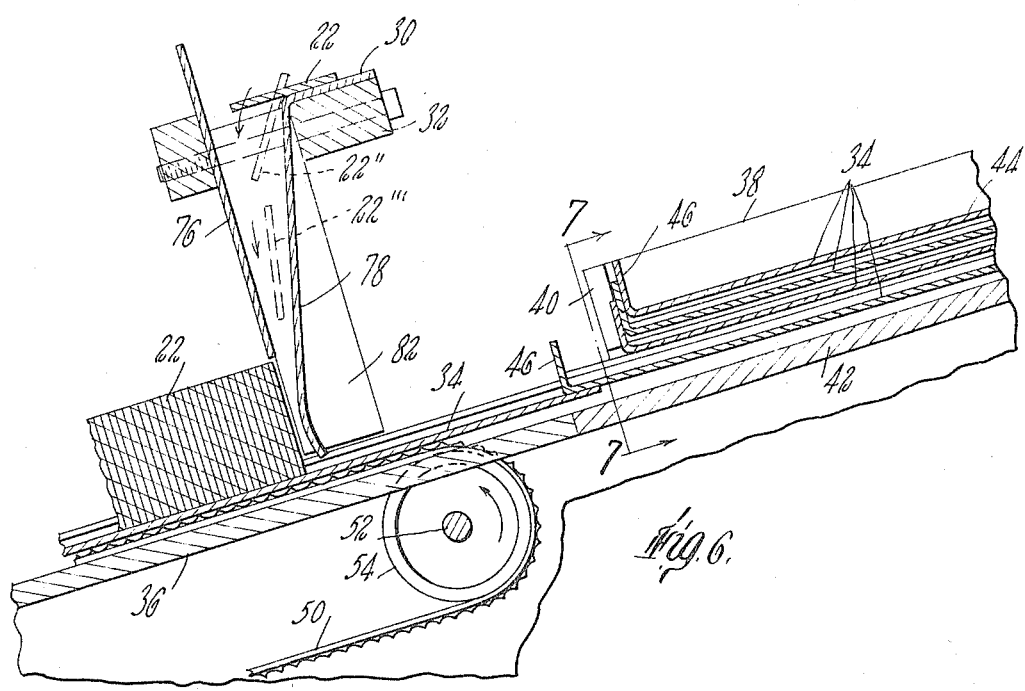
FIG. 6 is a vertical sectional view taken on line 6—6 of FIG. 3.

As the counter blank 22 moves out of engagement with the guide member 28 it slides sidewise on the bar 30 as appears in FIGS. 5 and 6 until it tips about the lower edge of the bar 30 and falls downwardly from the bar, being turned on edge as it falls. The downward falling movement of the counter blank is guided by a front guide plate 76 and an inclined back guide plate 78, the counter blank passing through the successive dotted line positions 22'', 22''', until it comes to rest on its edge on the surface 44 of the magazine 34. End guide members 80, 82, adjustable for different lengths of counter blanks, guide the falling counters into a position centered on the magazine 34 so that the notch 22' of the counted comes to rest on the upstanding bead 44' of the magazine.

As the filled magazine is moved downwardly by the belts 50, 50' it eventually passes off of the lower end of the belts and is released to move by gravity downwardly on to a table 84 on which it comes to rest, in a discharge position, when its lower end makes engagement with a ledge 86 rising above the surface of the table 84 at its lower end. Downward movement of the magazine after it has been released by the belts 50, 50' is retarded and controlled by pads 88, 90 of a friction material on the surface of the table 84.

Each filled magazine from the loading station when it has come to rest in its discharge position on the table 84 is moved transversely on to a storage platform 92 whose upper surface lies in continuation of the surface of the table 84. For this purpose a slide 94 is mounted for movement in a guideway 96 in the table 84 and storage platform 92. A pusher plate 98 upstanding from the slide 94 normally lies in alignment with the upturned edge 36' of the table 36 and a similar upturned guiding edge 84' on the table 84. The slide 94 and pusher plate 98 are adapted to be moved in the guideway 96 by means of a piston rod 100 connected to a piston 102 in a fluid pressure operated cylinder 104. A switch 106, connected by lead 108 to a solenoid valve 110, is located in position as shown to be tripped by a magazine 34 as it arrives at its position of rest on the table 84. Tripping of switch 106 causes the piston 102 to be moved to the right, as seen in FIG. 9, carrying the loaded magazine on to the storage platform 92 and pushing ahead of it other loaded magazines which have preceded it, and then to return to its initial position with the pusher plate 98 in alignment with the upturned edge 36'. The ledge 86 extends continuously along the bottom edge of the table 84 and the storage platform 92, retaining the loaded magazines in position. The loaded magazines may be removed by hand as needed from the storage platform 92. This platform 92 may be made of any length desired, to receive any desired number of loaded magazines and store them until the operator can give them his attention.

While a preferred embodiment of the invention has been shown and described, it is to be understood that the invention is not limited to the illustrated embodiment, which may be variously modified without departing from the spirit and scope of the invention as defined in the appended claims.

I claim:

1. An apparatus for loading flat articles into magazines comprising the combination of means for receiving the articles in succession and transporting them to a loading station, means for depositing the articles in succession into a magazine at the loading station, means for advancing the magazine step-by-step along a line past said depositing means in timed relation with the deposition of the articles into the magazine and into a discharge position beyond said depositing means, means for feeding a series of empty magazines in succession to said loading station, and means responsive to the arrival of a loaded magazine at said discharge position for moving the loaded magazines in succession laterally of the line of advance of the magazines and out of said discharge position.

2. An apparatus for loading flat articles into magazines comprising the combination of means for receiving the articles in succession in horizontal position and transporting them to a loading station, means for turning the articles in succession into a vertical position and depositing them in succession into a magazine at the loading station, means for advacing the magazine step-by-step along a line past said depositing means in timed relation with the deposition of the articles into the magazine and into a discharge position beyond said depositing means, means for feeding a series of empty magazines in succession to said loading station, and means responsive to the arrival of a loaded magazine at said discharge position for moving the loaded magazines in succession laterally of the line of advance of the magazines and out of said discharge position.

3. An apparatus for loading shoe counters into magazines comprising the combination of means for receiving the counters in succession in horizontal position and transporting them horizontally to a loading station, means for turning the counters into a vertical position and depositing them in succession into a magazine at the loading station, photoelectric means for sensing the arrival of each counter at the loading station, means controlled by said photoelectric means for advancing the magazine step-by-step along a line past said depositing means in timed relation with the deposition of the counters into the magazine, means for feeding a series of empty magazines in succession to said loading station, and means for moving the loaded magazines out of the loading station in succession laterally of the line of advance of the magazines.

4. An apparatus for loading shoe counters into magazines comprising the combiation of an apron for receiving the counters in succession in horizontal position and transporting them horizontally to a loading station, means for turning the counters in succession into a vertical position and depositing them on edge in succession into a magazine at the loading station, photoelectric means for sensing the arrival of each counter at the loading station, means controlled by said photoelectric means for advancing the magazine step-by-step along a line past said depositing means in timed relation with the deposition of the counters into the magazine, means for feeding a series of empty magazines in succession to said loading station, and fluid operated means for moving the loaded magazines away from the loading station in succession laterally of the line of advance of the magazines.

5. An apparatus for loading shoe counters into magazines comprising the combination of an apron for receiving the counters in succession in horizontal position and transporting them horizontally to a loading station, means for turning the counters in succession into a vertical position and depositing them on edge in succession into a magazine at the loading station, photoelectric means for sensing the arrival of each counter at the loading station, means controlled by said photoelectric means for advancing the magazine step-by-step along a line past said depositing means in timed relation with the deposition of the counters into the magazine, means for holding a vertical stack of empty magazines and having an inclined bottom wall along which the magazines may slide in succession under the influence of gravity to said loading station, and means for moving the loaded magazines away from the loading station in succession laterally of the line of advance of the magazines.

6. An apparatus for loading shoe counters into magazines comprising the combination of means for receiving the counters in succession in horizontal position and transporting them horizontally to a loading station, means for turning the counters in succession into a vertical position and depositing them in succession into a magazine at the loading station, means for advancing the magazine at the loading station step-by-step along a line past said depositing means in timed relation with the deposition of the counters into the magazine, means for holding a vertical stack of empty magazines and having an inclined bottom wall along which the magazines may slide in succession under the influence of gravity to said loading station, and means for moving the loaded magazines away from the loading station in succession laterally of the line of advance of the magazines.

7. An apparatus for loading shoe counters into a magazine which comprises means for receiving a series of shoe counters in succession in horizontal position and feeding them in succession toward a magazine, a spring guide for maintaining the counters in alignment on said means, a bar extending generally in prolongation of said means to receive the counters therefrom and having its upper surface inclined transversely of the line of travel of the counters with the lower edge of said surface disposed to underly the counters as they leave said means.

8. An apparatus for loading shoe counters into a magazine which comprises an apron for receiving a series of shoe counters in succession in horizontal position and feeding them in succession toward a magazine, a spring guide for maintaining the counters in alignment along one side of the apron, a bar extending generally in prolongation of said apron to receive the counters therefrom and having its upper surface inclined transversely of the line of travel of the counters with the lower edge of said surface disposed to underly the counters as they leave the apron.

9. An apparatus for loading shoe counters into tray-like magazines comprising the combination of means for holding a vertical stack of tray-like magazines and having an inclined bottom wall along which the magazines may slide in succession under the influence of gravity out of said stack, an inclined support having a flat surface for the reception of the magazines from said bottom wall and supporting them at a loading station, a traveling apron for receiving a series of shoe counters in succession in horizontal position and transporting them to said loading station, means for receiving the counters from said apron, turning them into vertical position and depositing them in succession on edge in the magazine at the loading station, photoelectric means for sensing the arrival of each counter at the loading station, movable means for advancing the magazine at the loading station step-by-step under the control of said photoelectric means and finally releasing said magazine to move by gravity out of the loading station, and means responsive to the release of a magazine from the loading station for engaging and moving the released magazine laterally on to a storage surface.

10. An apparatus for loading shoe counters into tray-like magazines comprising the combination of means for holding a vertical stack of tray-like magazines and having an inclined bottom wall along which the magazines may slide in succession under the influence of gravity out of said stack, an inclined support having a flat surface for the reception of the magazines from said bottom wall and supporting them at a loading station, a traveling apron for receiving a series of shoe counters in succession in horizontal position and transporting them to said loading station, means for receiving the counters from said apron, turning them into vertical position and depositing them in succession on edge in the magazine at the loading station, photoelectric means for sensing the arrival of each counter at the loading station, movable means for advancing the magazine at the loading station step-by-step under the control of said photoelectric means in adjustable timed relation with the deposition of the counters into the magazine, and finally releasing said magazine to move by gravity out of the loading station, and fluid operated means for engaging and moving the released magazine laterally on to a storage surface, and an electrical switch operated by release of a magazine from the loading station to initiate operation of said fluid operated means.

11. An apparatus for loading shoe counters into tray-like magazines comprising the combination of means for holding a vertical stack of tray-like magazines and having an inclined bottom wall along which the magazines may slide in succession under the influence of gravity out of said stack, an inclined support having a flat surface for the reception of the magazines from said bottom wall and supporting them at a loading station, a traveling apron for receiving a series of shoe counters in succession in horizontal position and feeding them in succession toward a magazine at said loading station, a spring guide for maintaining the counters in alignment along one side of the apron, a bar extending generally in prolongation of said apron to receive the counters therefrom and having its upper surface inclined transversely of the line of travel of the counters with the lower edge of said surface disposed to underlie the counters as they leave said apron to turn the counters into vertical position and deposit them in succession on edge in the magazine at the loading station, photoelectric means for sensing the arrival of each counter at the loading station, movable means for advancing the magazine at the loading station step-by-step under the control of said photoelectric means in adjustable timed relation with the deposition of the counters into the magazine, and finally releasing said magazine to move by gravity out of the loading station, and fluid operated means for engaging and moving the released magazine laterally onto a storage surface, and an electrical switch operated by release of a magazine from the loading station to initiate operation of said fluid operated means.

References Cited by the Examiner

UNITED STATES PATENTS

| | | | |
|---|---|---|---|
| 2,171,362 | 8/1939 | Gulliksen | 250—223 |
| 2,728,508 | 12/1955 | Marasso | 53—244 |
| 2,959,903 | 11/1960 | Lancaster | 53—246 |
| 2,980,932 | 4/1961 | Seammon | 12—66 |
| 3,000,161 | 9/1961 | Horgan | 53—244 |
| 3,044,085 | 7/1962 | Johnson et al. | 12—66 |
| 3,072,797 | 1/1963 | Vacchelli | 250—223 |
| 3,090,178 | 5/1963 | Furst et al. | 53—246 |
| 3,147,500 | 9/1964 | Ralphs | 12—1 X |

PATRICK D. LAWSON, *Primary Examiner.*

R. G. NILSON, *Examiner.*

E. STRICKLAND, *Assistant Examiner.*